(12) United States Patent
Madhavan et al.

(10) Patent No.: US 8,810,428 B2
(45) Date of Patent: Aug. 19, 2014

(54) ELECTRICAL TRANSMISSION BETWEEN ROTATING AND NON-ROTATING MEMBERS

(75) Inventors: Raghu Madhavan, Yokohama (JP); Frederic Latrille, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 878 days.

(21) Appl. No.: 12/202,722

(22) Filed: Sep. 2, 2008

(65) Prior Publication Data
US 2010/0052941 A1    Mar. 4, 2010

(51) Int. Cl.
*G01V 3/18* (2006.01)
*E21B 47/12* (2012.01)

(52) U.S. Cl.
USPC .......................... 340/854.3; 175/40

(58) Field of Classification Search
USPC ................... 340/854.8; 175/40, 107
See application file for complete search history.

(56) References Cited

U.S. PATENT DOCUMENTS

| | | | |
|---|---|---|---|
| 4,436,168 A * | 3/1984 | Dismukes ...................... | 175/94 |
| 4,605,268 A | 8/1986 | Meador | |
| 4,788,544 A | 11/1988 | Howard | |
| 4,806,928 A | 2/1989 | Veneruso | |
| 4,845,493 A | 7/1989 | Howard | |
| 5,455,573 A * | 10/1995 | Delatorre .................. | 340/854.8 |
| 5,725,061 A * | 3/1998 | Van Steenwyk et al. ..... | 175/104 |
| 6,427,783 B2 * | 8/2002 | Krueger et al. ................. | 175/40 |
| 6,540,032 B1 * | 4/2003 | Krueger ........................... | 175/40 |
| 6,641,434 B2 | 11/2003 | Boyle et al. | |
| 6,670,880 B1 | 12/2003 | Hall | |
| 7,064,676 B2 | 6/2006 | Hall et al. | |
| 7,083,452 B2 | 8/2006 | Eriksson et al. | |
| 7,248,177 B2 | 7/2007 | Hall et al. | |
| 7,934,570 B2 * | 5/2011 | Hall et al. ...................... | 175/320 |
| 2002/0135179 A1 | 9/2002 | Boyle et al. | |
| 2005/0087368 A1 * | 4/2005 | Boyle et al. ...................... | 175/57 |
| 2006/0086536 A1 * | 4/2006 | Boyle et al. ...................... | 175/40 |
| 2006/0225926 A1 * | 10/2006 | Madhavan et al. ............ | 175/320 |
| 2006/0260797 A1 | 11/2006 | Hall et al. | |
| 2006/0260798 A1 | 11/2006 | Hall et al. | |
| 2006/0283606 A1 * | 12/2006 | Partouche et al. ............ | 166/380 |
| 2007/0079988 A1 * | 4/2007 | Konschuh et al. .............. | 175/40 |
| 2007/0257812 A1 * | 11/2007 | Lasater et al. ............. | 340/854.8 |

FOREIGN PATENT DOCUMENTS

WO    WO2004015242    2/2004

OTHER PUBLICATIONS

Collins English Dictionary definition of "induction motor" accessed via thefreedictionary.com on Feb. 8, 2012.*
Dictionary definition of "around", accessed on May 20, 2013 via thefreedictionary.com.*
International Search Report and the Written Opinion for International Application No. PCT/US2009/053649 dated Mar. 19, 2010.

(Continued)

*Primary Examiner* — Blake Michener
(74) *Attorney, Agent, or Firm* — Kimberly Ballew; Mark D. Shelley, II

(57) ABSTRACT

A rotary coupler for transferring electrical power and data between members is presented wherein the coupler has a first member having an internal surface, a first inductor positioned on the internal surface, a second member and a second inductor carried on a portion of the second member and positioned internal of the first inductor, wherein one of the inductors rotates relative to the other inductor.

12 Claims, 6 Drawing Sheets

(56) References Cited

OTHER PUBLICATIONS

Examination Report for GB Application No. GB1103909.6 dated Jan. 27, 2012.

\* cited by examiner

ELECTRICAL TRANSMISSION BETWEEN ROTATING AND NON-ROTATING MEMBERS

BACKGROUND

In logging-while-drilling and measurement-while-drilling systems it is advantageous to position one or more sensors as close to the drill bit as possible. The data that is obtained by the sensors is transferred to a subsurface telemetry unit and then transmitted to a surface telemetry unit. Information from the surface may be transmitted to the subsurface telemetry system to the sensors or to control the direction of drilling with steerable systems and the like. Positioning sensors proximate to the drill bit provides data relative to the position of the drill bit and provides greater control of operations to the driller.

In some drilling operations, such as in directional drilling situations, a mud motor is utilized to drive the drill bit. The mud motor converts the flow of the drilling fluid into a rotation of the drill bit and other components positioned below the mud motor. The rotational operation of the mud motor presents an obstacle to providing electrical wiring to sensors or other electronics positioned below the mud motor. Thus, in drilling operations in which real time positional and wellbore data proximate to the drill bit is at a premium, the positioning of sensors near the bit is prohibitive.

SUMMARY

In view of the foregoing and other considerations, the present invention relates to devices, systems and method for transferring electrical signals, data, and electrical power across a rotating gap.

An example of a rotary coupler includes a first member having an internal surface, a first inductor positioned on the internal surface, a second member, and a second inductor carried on a portion of the second member and positioned internal of the first inductor, wherein one of the inductors rotates relative to the other inductor.

An example of a downhole drilling motor having an upper and a lower end includes a stator positioned about a rotor, the rotor rotatable relative to the stator; a first terminus positioned proximate to upper end of the motor for connecting to a first electronic device; a second terminus positioned proximate to the lower end of the motor for connecting to a second electronic device; and a rotary coupler operationally connecting the first terminus and the second terminus.

In example of a method for conducting wellbore drilling operations includes the steps of suspending a bottom-hole assembly (BHA) on a drillstring from a surface into a wellbore, the BHA including a mud motor, a subsurface telemetry unit positioned above the mud motor, and a sensor positioned below the mud motor, the mud motor having a rotary coupler operationally connecting the subsurface telemetry unit to the sensor; obtaining data by the sensor; transferring the data via the rotary coupler to the subsurface telemetry unit; and transmitting the data from the subsurface telemetry unit to a surface telemetry unit.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
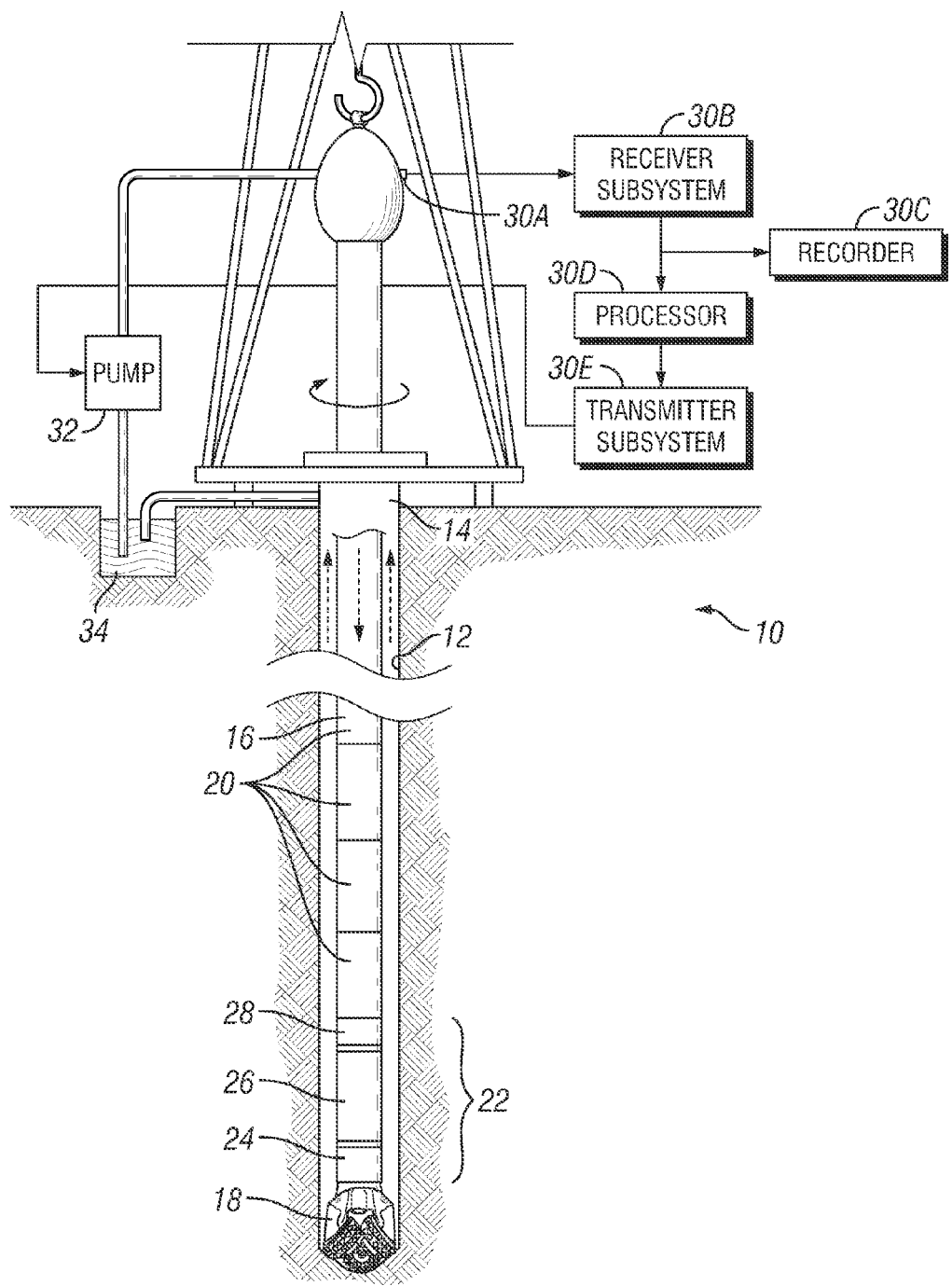
FIG. 1 is a schematic illustration of an example of a system for operationally coupling electronic elements across a mud motor.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point at the surface from which drilling operations are initiated as being the top point and the total depth of the well being the lowest point, whether or not the drilled well continues in a true downward direction. Like elements in the various figures may be denoted by like reference numerals for consistency.

FIG. 1 is an illustration of a wellbore operation utilizing a system for electrical transmission through a rotating connection of the present invention, generally denoted by the numeral 10. System 10 will be described herein with reference to a mud motor and the conveyance of electrical power and electrical signals across the mud motor. While the invention is not limited to a mud motor application, the mud motor examples shown herein provide an efficient manner of describing various structure, function and benefits.

As shown in FIG. 1, a drilling assembly, illustrated as a land rig, is shown positioned over a wellbore 12 that penetrates a subsurface formation F. A portion of wellbore 12 may be completed with casing 14. A drillstring 16 extends from the drilling rig at the surface to a drilling bit 18 connected to the lowest end of drillstring 16 and distal from the surface. In the illustrated example, drillstring 16 is constructed of a plurality of interconnected drillpipe joints 20. It should be noted that drillstring 16 may be coiled tubing and include conductors in the side walls or other telemetry systems for communicating data.

Drillstring 16 includes a bottom hole assembly ("BHA") 22 positioned proximate to drill bit 18. BHA 22 includes one or more sensors 24, a mud motor 26, and a subsurface telemetry unit 28. Sensors 24 may be essentially any type of sensing or measuring device for use in geophysical wellbore measurements. Sensors 24 may include, but are not limited to, gamma radiation detectors, neutron detectors, inclinometers, accelerometers, acoustic sensors, electromagnetic sensors, pressure sensors, and the like. Sensors 24 are often provided singularly or in combination and referred to generally as logging and measurement tools and referred to herein as logging-while-drilling (LWD) and measurement-while-drilling (MWD) tools. Suitable elements (not shown) such as and without limitation, include an electronics package, a power source, and the like, so that the sensor 24 may collect data and generate a signal that is representative of the data. All such components are generally referred to as a sensor 24 Commonly, sensors 24 will be included in a drilling collar and will be referred to herein from time to time as a sensor sub.

Subsurface telemetry unit 28 may be in electrical, power, and data communication with sensor 24 through mud motor 26 which will be disclosed in more detail with reference to FIGS. 2-6. Surface telemetry subsystem generally denoted by the numeral 30, may include a transducer 30a to receive a signal from downhole, a receiving subsystem 30b, a processor 30c, a recorder 30d, and a transmitting subsystem 30e for sending signals downhole. Surface telemetry subsystem 30 may also include mud pump 32.

Subsurface telemetry unit 28 is in communication with a surface telemetry subsystem 30. The communication link between subsurface telemetry unit 28 and surface telemetry subsystem 30 may be by various means including, but not limited to, wired pipe, mud pulse telemetry, and electromagnetic telemetry. For example, drill string 16 illustrated herein may be a wired telemetry system wherein joints 20 are interconnected to form a communication link between subsurface telemetry unit 28 and surface telemetry system 30. Wired pipe includes one or more tubular members, such as drill pipe joints 20, drill collars, casing, liner, and casing that are used as a wired communication link. The wired communication link may include short hops across non-wired gaps such as between the drill string and the casing.

One example of wired joints 20, known as wired drillpipe (WDP), is disclosed in U.S. Pat. No. 6,641,434 to Boyle et al and assigned to the assignee of the present invention, the teachings of which are incorporated herein. Joints 20 may use communicative, inductive couplers, to transmit signals from one joint 20 to the adjacent joint 20. The inductive coupler may include a transformer that has a toroidal core made of a high permeability, low loss material such as Supermalloy (which is nickel-iron alloy processed for exceptionally high initial permeability and suitable for low level signal transformer applications). A winding, consisting of multiple turns of insulated wire, coils around the toroidal core to form a toroidal transformer. In one configuration, the toroidal transformer is potted in rubber or other insulating materials, and the assembled transformer is recessed into a groove located in the drillpipe connection.

Mud motor 26 is a device that is typically used to convert hydraulic energy in the flowing mud to a rotational energy, which may be used to generate electricity or to rotate the drill bit. Mud motor 26 described herein is an example of a rotary coupler that provides electrical communication of power and/or data between a rotating and a non-rotating member. In the illustrated examples, the rotary coupler provides communication across a gap between a member that rotates relative to another member, and more specifically wherein one member is positioned interior to the other member.

Figure 2:
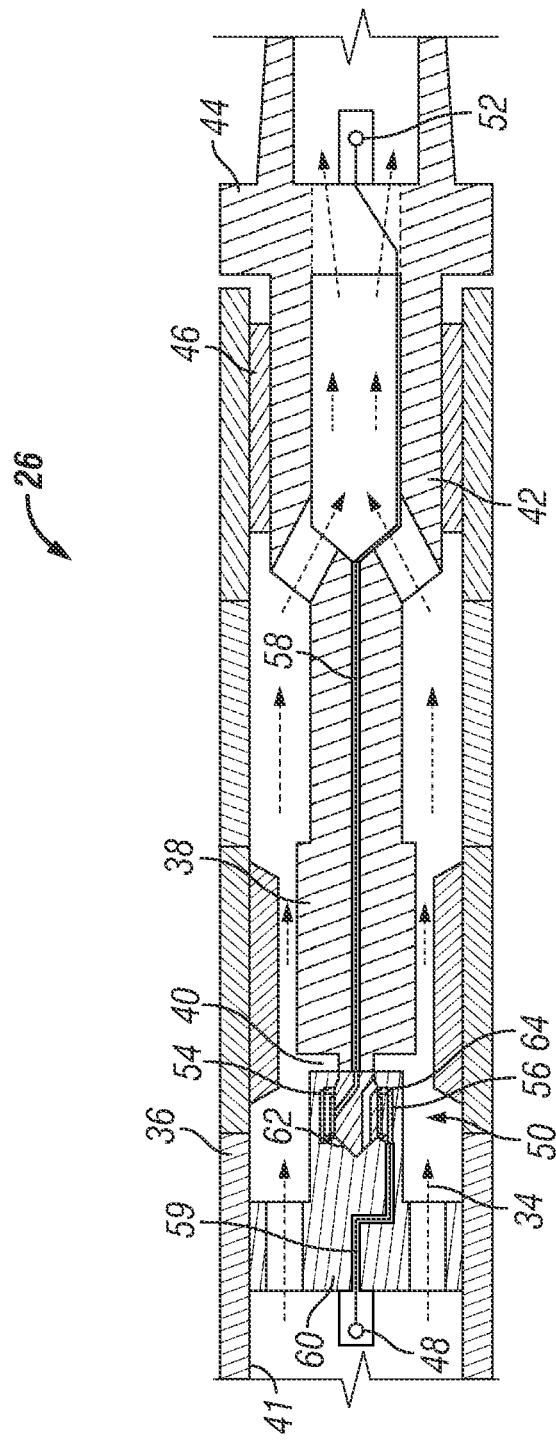
FIG. 2 is a schematic view of an example of a mud motor for operationally coupling electronic elements across a mud motor.

Refer now to FIG. 2 wherein a cross-sectional view of an example of a mud motor 26 utilizing a rotary coupler is provided. Mud motor 26 generally includes a housing or stator 36 disposed about a rotor 38. Motor 26 may include multiple sub and other elements such a bent sub that are not shown specifically herein. The flow of drilling mud 34, shown by the arrows, rotates rotor 38 within stator 36. Rotor 38 extends from a proximal end 40 through a drive shaft section 42 to a distal end 44 of both rotor 38 and mud motor 26. Proximal end 40 of rotor 38 is positioned toward proximal end 41 of stator 36.

With additional reference to FIG. 1, proximal end 41 is adapted for connection to drill string 16 and is thus proximate to the surface where drilling operations were commenced. Distal end 44 is illustrated as an enlarged section such as drill collar and adapted for connecting with another member such as a sub carrying sensor 24. It is noted that proximal and distal are utilized herein for describing elements in relation to their position along the drill string, wherein proximal is closer to the surface along the length of the drill string and distal is closer to the drill bit, along the length of the drill string.

One or more bearing assemblies 46 are disposed interior to stator 36 and exterior to rotor 38 to support the axial and radial loads. Mud motor 26 further includes a proximate terminus or bus 48 that is electrically connectable to the subsurface telemetry unit 28 (FIG. 1) and a distal terminus or bus 52 that is electrically connectable to sensors 24 (FIG. 1). It is noted that terminus 48 and terminus 52 may include various apparatus and devices for operationally connecting with the other electronic elements, for example telemetry unit 28 and sensor 24. For example, terminus 48 and 52 may provide, without limitation, physical electrical connection, wet connects, and inductors.

As disclosed with reference to FIG. 1, mud motor 26 provides an electrical transmission link between electronic elements positioned on opposing ends of mud motor 26. Thus, mud motor 26 operationally connects sensor 24 on one side of mud motor 26 with subsurface telemetry unit 28 positioned on the other side of motor 26. "Operationally connects," "operationally coupled," and other like terms and phrases include connected in manner to transfer electrical power and/or data.

Figure 5:
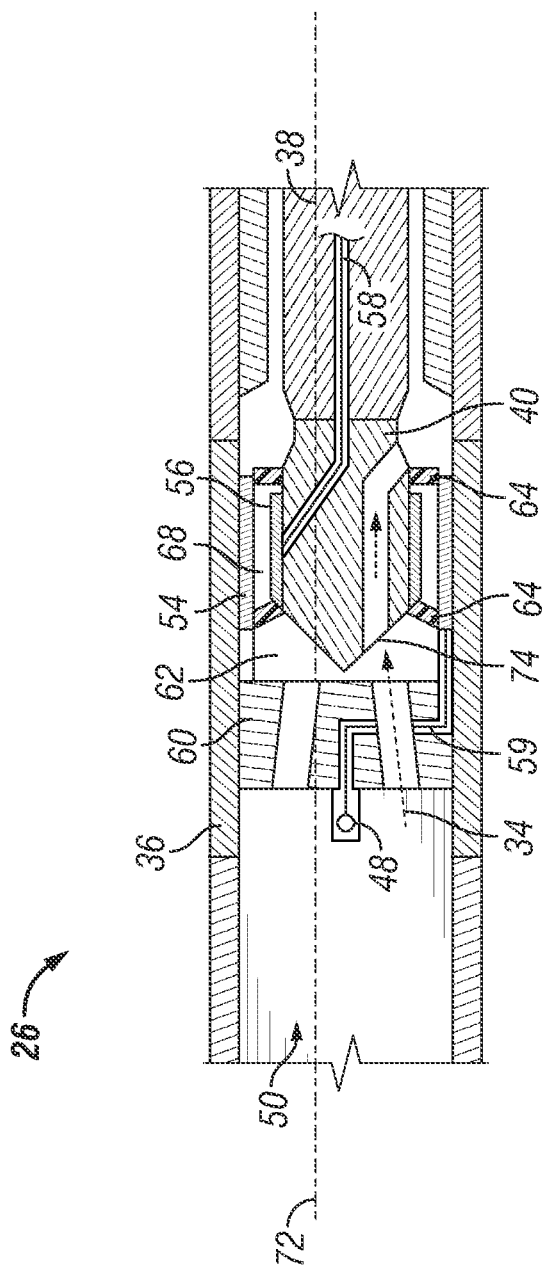
FIG. 5 is a schematic view of another example of a mud motor for operationally coupling electronic elements across a mud motor.
Figure 6:
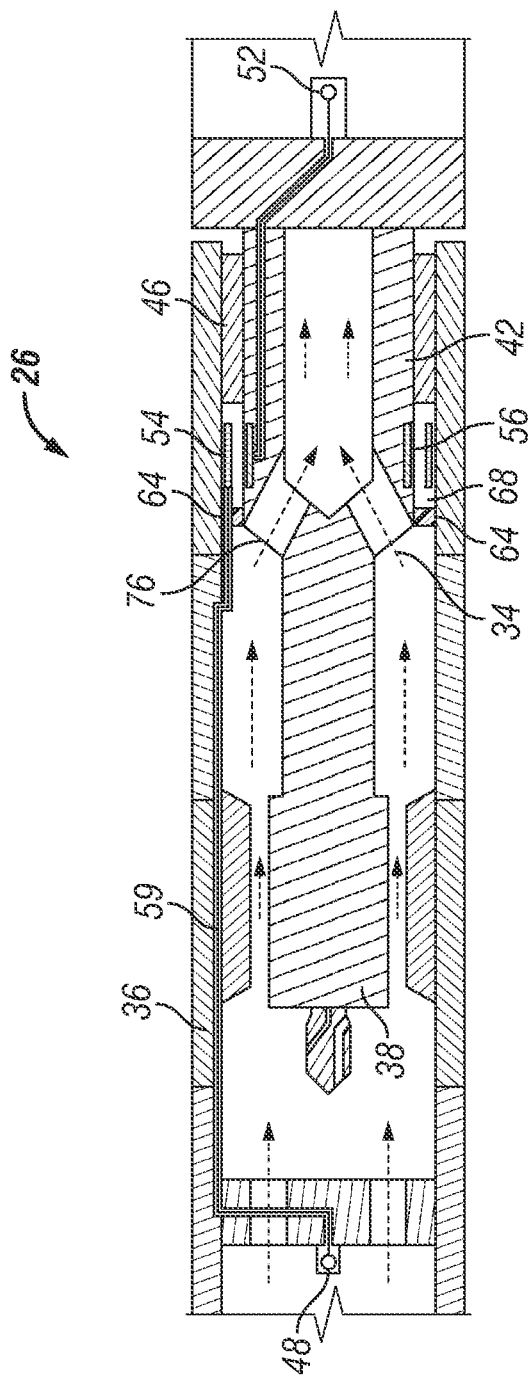
FIG. 6 is a schematic view of another example of a mud motor for operationally coupling electronic elements across a mud motor.

To operationally connect the electronic elements above motor 26 with those below motor 26, electrical power and/or data must be transferred across a gap 68 between the rotating rotor 38 and the non-moving elements generally denoted as stator 36. This operational rotary connection is provided by a rotary coupler, generally designated by the numeral 50. Rotary coupler 50 includes a first inductor 54 connected to a first member and a second inductor 56 connected with a second member, wherein one of the members rotates relative to the other member. In the examples illustrated herein, one of the inductors is positioned internal of the other inductor. In the examples of FIGS. 2, 5, and 6, the first member is designated as structure 60 and is in connection with stator 36, and therefore is stationary, relative to the second member designated as rotor 38.

Inductors 54 and 56 may be toroidal inductors, for example, formed of a ferrite ring around which a conductor is wrapped. Transmission of signals between adjacent coils in an inductive coupler is described in U.S. Pat. No. 4,806,928 to Veneruso, entitled "Apparatus for Electromagnetically Coupling Power and Data Signals Between Wellbore Apparatus and the Surface," which is incorporated hereby by reference.

Figure 3:
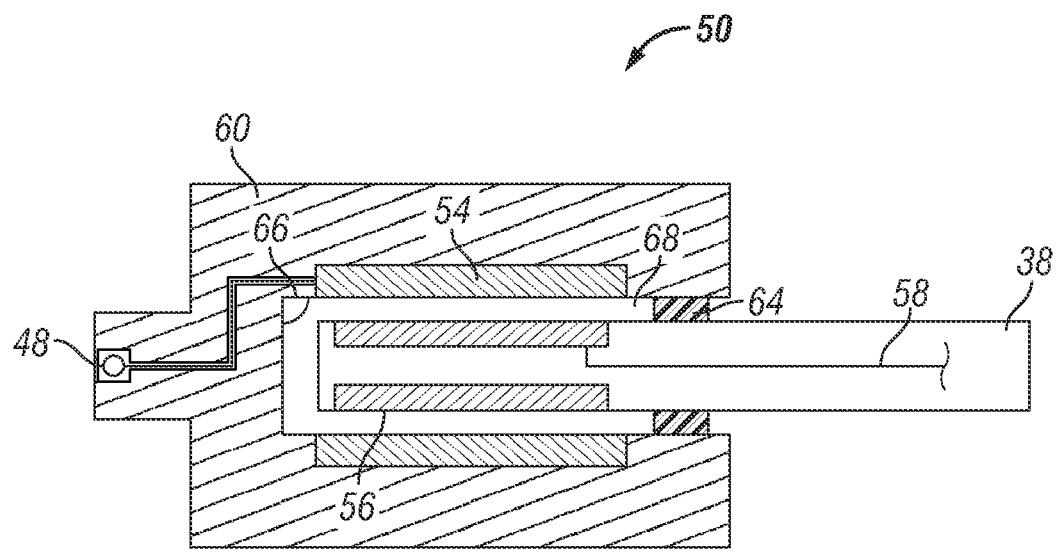
FIG. 3 is a conceptual illustration of an example of a pin and socket configuration of a rotary coupler.

In the example of FIGS. 2 and 3, rotating inductor 56 is electrically connected by a conductor 58 to distal terminus 52 Proximal end 40 of rotor 38 may be formed into a pin shaped member. Inductor 56 may be formed in a groove (not shown) formed in proximal end 40, or inductor 56 may substantially form pin shaped proximal end 40.

In the example of FIGS. 2 and 3, inductor 54 is positioned on the internal surface of a socket 62 formed by structure 60. In this example, structure 60 is a member physically connected with stator 36 and thus it is stationary or non-rotating relative to rotor 38. Inductor 54 may be electrically connected to terminus 48 through conductor 59.

Rotating inductor 56 is positioned in socket 62 and internal to non-rotating inductor 54. A sealing element 64 may be positioned in relation to proximal end 40 and socket 62 to provide a fluid barrier. Sealing the inductors 54 and 56 from a conductive drilling fluid 34 may increase the efficiency of the operational connection.

Refer now to FIG. 3 wherein a conceptual illustration of a rotary coupler 50 is shown in isolation. Rotary coupler 50 includes a first tubular member 60 having a first inductor 54 positioned along a portion of a surface 66 that defines socket 62. A second inductor 56 is connected to second member 38 and positioned within socket cavity 62. A gap 68 exists between inductors 54 and 56. It is again noted that inductor 56 is positioned internal to inductor 54, and one of inductors 54 or 56 rotates relative to the other inductor and its carrying member.

Gap 68, in the example of FIG. 3, is a radial gap of approximately 0.03 to 0.1 inch (0.0762 to 0.0254 cm) between inductor 54 and inductor 56. In some situations, rotary coupler 50 may be subject to a conductive fluid, such as saltwater or a water-based mud. It is contemplated that rotary coupler 50 will successfully operationally couple inductors 54 and 56 when a conductive fluid is in gap 68. A barrier to entry of liquid into gap 68 may be provided or formed to assist or improve transmission across gap 68. It is also noted that a fluid may be disposed and maintained in gap 68.

Figure 4:
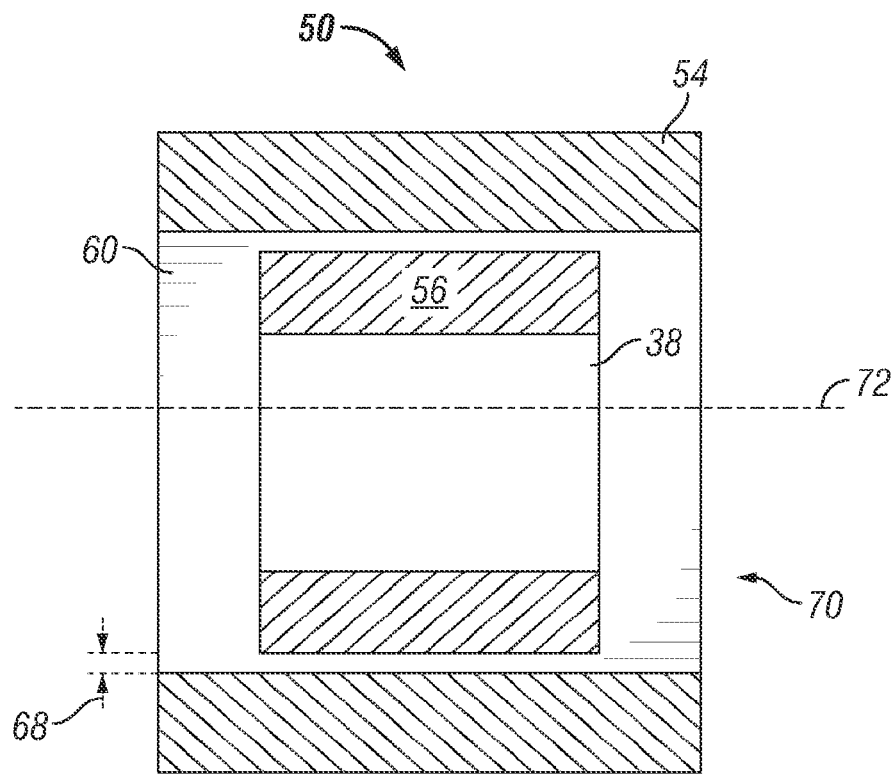
FIG. 4 is a conceptual illustration of an example of a annular configuration of a rotary coupler.

Refer now to FIG. 4, wherein a conceptual illustration of another example of a rotary coupler 50, referred to as an annular configuration is provided. In the annular example, first member 60 is tubular member having an internal bore 70, and having a longitudinal axis denoted by the number 72. First inductor 54 is positioned internal of member 60 defining at least a portion of bore 70. It should be recognized that in some applications, first inductor 54 may comprise first member 60. Second inductor 56 is positioned internal of first inductor 54, and is connected on at least a portion of second member 38. Gap 68 is more clearly illustrated as an annular gap between inductors 54 and 56.

With specific reference to FIGS. 3 and 4, it may be realized that positioning one inductor internal of the other inductor forms an elongated, longitudinal overlapping of inductor 54 and inductor 56. This longitudinal overlapping arrangement facilitates maximizing the surface area of inductor 54 and 56 that are aligned with one another while maintaining a compact coupler 50 for utilization in many applications. The longitudinal type alignment also alleviates misalignment of the poles of the opposing inductors as one inductor rotates relative to the other. The larger opposing inductor surface areas may improve operational coupling significantly.

Refer now to FIG. 5, wherein an annular type rotary coupler 50 is illustrated in a mud motor 26. In this example, first inductor 54 is connected to a structure 60 and extends longitudinally along the internal surface of stator 36. Inductor 54 may be connected directly to stator 36 as well. Structure 60 also extends laterally across the internal bore of stator 36 and carries terminus 48. Terminus 48 is shown as electrically connected to inductor 54 by conductor 59. It is noted that drilling mud 34 flows, as indicated by the arrows, through structure 60 and through socket 62 as opposed to the pin and socket configuration of FIG. 2, wherein mud 34 is substantially directed around structure 60, which is a three-sided box, defining socket 62. In this example, a conduit 74 is formed through proximal end 40 of rotor 38 and around inductor 56 to facilitate directing at least a portion of mud 34 around gap 68. Seal elements 64 may be provided on opposing sides of gap 68, or at least the proximal side of gap 68, to form a barrier to flow of drilling mud 34 through gap 68.

FIG. 6 provides an additional example of a mud motor 26. In this example, rotary coupling is provided in the power or bearing section of mud motor 26. Inductor 56, the rotating inductor, is positioned longitudinally along a drive shaft portion 42 of rotor 38 and proximate to bearings 46. Inductor 54 is positioned longitudinally along an internal portion of the housing of mud motor 26 referred to generally as stator 36 adjacent to inductor 56. A fluid barrier to gap 68 may be provided, such as seal element 64, positioned on the proximal side of gap 68.

With reference to FIGS. 1-8, a method of operation and of conducting drilling operations is described. BHA 22 is connected to a drill string 16 and is conveyed into wellbore 12. BHA 22 includes drill bit 18, sensors 24, mud motor 26, and a subsurface telemetry unit 28. Sensor 24 are positioned below motor 26 and proximate to bit 18 to provide as accurate of information relative to the position of bit 18 as possible. Mud motor 26 includes a rotary coupler 50 to operationally connect sensor 24 to subsurface telemetry unit 28. Data acquired by sensor 24 is transferred through mud motor 26 to telemetry unit 28 where the data is transmitted to surface telemetry unit 30 in this example via wired drill string 16. Data and/or power may be transferred from telemetry unit 30 through mud motor 26 to sensors 24.

Circulating drilling mud 34 causes rotor 38 to rotate relative to the housing of motor 26 referred to as stator 36. Rotor 38 includes a drive shaft portion 42 that connects to the sub carrying sensors 24 and drill bit 18, rotating sensors 24 and bit 18 relative to stator 36. A stationary inductor 54 is positioned about an inductor 56 that is rotating relative to inductor 54. Inductor 56 is positioned on a portion of rotor 38, such as by example proximal or uphole end 40 or a portion of drive shaft section 42. Inductor 54 may be carried on stator 36 or a structure 60 so as to be positioned about inductor 56 to form a gap 68. In the illustrated examples, gap 68 is radial gap of approximately 0.03 to 0.1 inch (0.0762 to 0.254 cm). In some examples, a socket 62 or cavity may be formed with inductor 54 connected within the structure defining the socket and inductor 56 disposed in the socket.

In various examples, mechanisms may be provided to direct flowing drilling mud 34 around gap 68 or provide a fluid barrier to gap 68. For example, fluid barriers including, but not limited to, socket 62, flow bypass conduits 74 and 76, and seal elements 64 may be utilized singularly or in combination. In one example of mud motor 26, 400 watts can be transmitted across rotary coupler 50, the power transmission efficiency is approximately greater than 0.99, and gap 68 may be filled with a conductive fluid such as saltwater (approximately 0.04 ohm-meter). Mud motor 26 and coupler 50 is contemplated to provide operational coupling at temperatures of 175 degrees Celsius and/or 25 kpsi (about 172,000 kPa).

Figure 7:
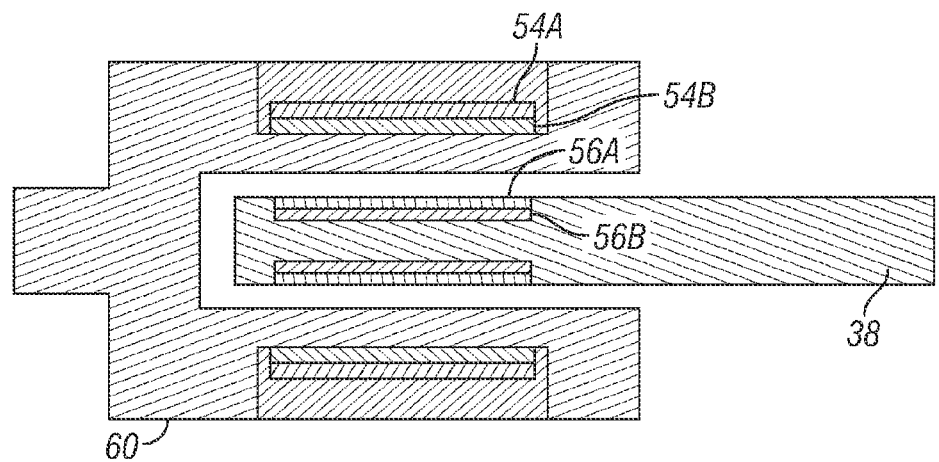
FIG. 7 is a schematic view of another example of a rotary coupler.

FIG. 7 shows an alternate example of a coupler. The structure 60 connected to the stator includes an inductor comprised of a Mu-metal tape 54*b* that is applied to the structure 60 before wrapping a conductor 54*a*. Similarly, a Mu-metal tape 56*b* may be applied to the rotor 38 inside of the conductor 56*a*. This example illustrates the use of magnetic material other than ferrite. In this example, the Mu-metal may comprise Supermalloy, or other suitable materials known in the art.

Figure 8:
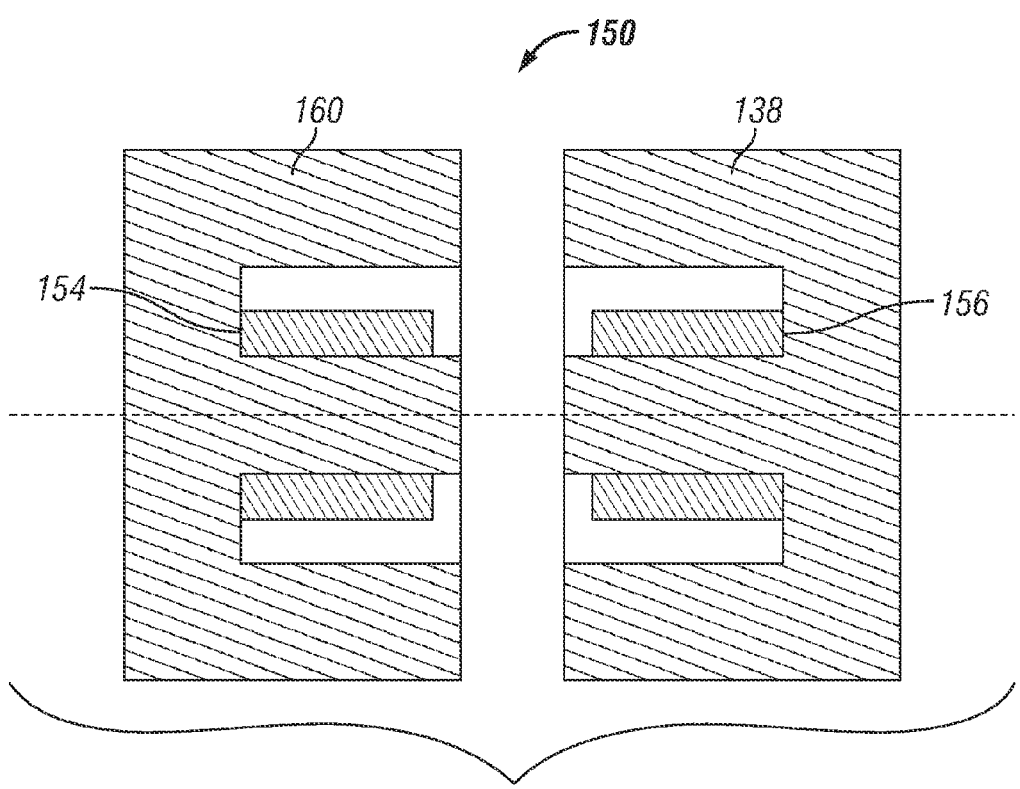
FIG. 8 is a schematic view of another example of a rotary coupler.

FIG. 8 shows another example of a coupler 150 that includes inductive elements 154, 156 located in elements in a face-to-face configuration. The structure 160 associated with the stator houses a first inductive element 154, and the structure 160 is in a face-to-face arrangement with the rotor 138. The rotor 138 houses a second inductive element 156. The two inductive elements are operationally connected to communicate data and power.

From the foregoing detailed description of specific embodiments of the invention, it should be apparent that a system for transmitting electrical power and data between a rotating and non-rotating member that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A rotary coupler for transferring electrical power and or data between members, the coupler comprising:
    a first member having an internal surface defining a flow path configured to route a flow of fluid through the first member, the first member having an upstream fluid end through which the fluid enters and a downstream fluid end;
    a first inductor positioned on the internal surface of the first member;
    a second member having at least one conduit through a portion of the second member, the at least one conduit situated within the flow path of the first member between the upstream fluid end and the downstream fluid end such that at least a portion of the flow of fluid in the first member also flows through the at least one conduit of the second member; and
    a second inductor on a portion of the second member, the second inductor positioned internal of the first inductor and spaced apart from the first inductor by a gap, wherein one of the inductors rotates relative to the other inductor; and
    an arrangement configured to divert fluid flow away from the gap wherein the arrangement includes a sealing element, the sealing element being positioned in the gap between the first inductor and the second inductor forming a barrier that prevents the flow of fluid from entering the gap, while the at least one conduit is configured to direct at least a portion of the flow of fluid through the second member to bypass the gap.

2. The coupler of claim 1, wherein the gap between the first inductor and the second inductor is between approximately 0.03 inch (0.0762 cm) to 0.1 inch (0.254 cm).

3. The coupler of claim 1, wherein the internal surface of the first member defines a socket and the second inductor is positioned inside of the socket.

4. The coupler of claim 1, further including a fluid flowing through the first member.

5. The coupler of claim 1, wherein the first and second inductors comprise a conductor wound around a magnetic material.

6. The coupler of claim 5, wherein the magnetic material comprises a Mu-metal.

7. The coupler of claim 6, wherein the Mu-metal comprises Supermalloy.

8. A downhole drilling motor, the motor comprising:
    a stator having an internal surface defining a flow path configured to route a flow of drilling fluid through the stator, the stator having an upstream fluid end through which the fluid enters and a downstream fluid end;
    a rotor having at least one conduit through a portion of the rotor, the rotor positioned proximate the stator wherein the rotor is rotatable relative to the stator via the flow of drilling fluid between the rotor and the stator, and wherein the at least one conduit is situated within the flow path of the stator between the upstream fluid end and the downstream fluid end such that at least a portion of the flow of drilling fluid in the stator also flows through the at least one conduit of the rotor;
    a first terminus positioned proximate to an upper end of the motor for connecting to a first electronic device;
    a second terminus positioned proximate to a lower end of the motor for connecting to a second electronic device; and
    a rotary coupler operationally connecting the first terminus and the second terminus, the coupler comprising:
        a first inductor located on a portion of an internal surface of the stator, the first inductor being electrically connected to the first terminus;
        a second inductor located on a portion of the rotor and electrically connected to the second terminus, the second inductor positioned internal of the first inductor and spaced apart from the first inductor by a gap; and
        an arrangement configured to divert drilling fluid flow away from the gap wherein the arrangement includes a sealing element, the sealing element being positioned in the gap between the first and second inductors forming a barrier that prevents the flow of drilling fluid from entering the gap, while the at least one conduit is configured to direct at least a portion of the flow of drilling fluid through the rotor to bypass the gap.

9. The motor of claim 8, wherein the stator further comprises a first member defining a socket, and the first inductor is located on a portion of an internal surface of the first member.

10. The coupler of claim 8, wherein the first and second inductors comprise a conductor wound around a magnetic material.

11. The coupler of claim 10, wherein the magnetic material comprises a Mu-metal.

12. The coupler of claim 11, wherein the Mu-metal comprises Supermalloy.

* * * * *